US012812653B2

(12) United States Patent
Liu et al.

(10) Patent No.: US 12,812,653 B2
(45) Date of Patent: Nov. 24, 2026

(54) BEHAVIOR DETERMINING METHOD AND APPARATUS, AND RELATED DEVICE

(71) Applicant: VIVO MOBILE COMMUNICATION CO., LTD., Guangdong (CN)

(72) Inventors: Hao Liu, Guangdong (CN); Rakesh Tamrakar, Guangdong (CN); Peng Sun, Guangdong (CN); Zhi Lu, Guangdong (CN); Gen Li, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 217 days.

(21) Appl. No.: 18/619,940

(22) Filed: Mar. 28, 2024

(65) Prior Publication Data

US 2024/0244631 A1 Jul. 18, 2024

Related U.S. Application Data

(63) Continuation of application No. PCT/CN2022/121732, filed on Sep. 27, 2022.

(30) Foreign Application Priority Data

Sep. 30, 2021 (CN) .......................... 202111164611.6

(51) Int. Cl.
*H04W 72/23* (2023.01)
*H04B 7/06* (2006.01)
*H04L 5/00* (2006.01)

(52) U.S. Cl.
CPC .......... *H04W 72/23* (2023.01); *H04B 7/0626* (2013.01); *H04L 5/0007* (2013.01)

(58) Field of Classification Search
CPC ..... H04W 72/23; H04W 72/04; H04W 72/51; H04B 7/0626; H04B 7/06968;
(Continued)

(56) References Cited

U.S. PATENT DOCUMENTS

2016/0330633 A1 11/2016 You et al.
2021/0144743 A1 5/2021 Rastegardoost et al.
2023/0049043 A1* 2/2023 Li .................... H04W 52/0235

FOREIGN PATENT DOCUMENTS

CN 110932825 A 3/2020
CN 111262674 A 6/2020
(Continued)

OTHER PUBLICATIONS

International Search Report for International Application No. PCT/CN2022/121732 of Dec. 21, 2022.
(Continued)

*Primary Examiner* — Diane D Mizrahi
(74) *Attorney, Agent, or Firm* — Perilla Knox & Hildebrandt; Kenneth A. Knox

(57) ABSTRACT

This application discloses a behavior determining method and apparatus, and a related device. The method includes: obtaining, by a terminal, target information, where the target information is associated with a plurality of candidate resources for PDCCH repetition transmission; and determining, by the terminal, a terminal behavior based on the target information.

19 Claims, 7 Drawing Sheets

(58) Field of Classification Search
CPC ... H04L 5/0007; H04L 5/0053; H04L 5/0094; H04L 5/00
See application file for complete search history.

(56) References Cited

FOREIGN PATENT DOCUMENTS

| | | | |
|---|---|---|---|
| CN | 111314036 | A | 6/2020 |
| CN | 111865541 | A | 10/2020 |
| CN | 112399579 | A | 2/2021 |
| CN | 113366898 | A | 9/2021 |
| WO | 2020006416 | A1 | 1/2020 |
| WO | 2021184268 | A1 | 9/2021 |

OTHER PUBLICATIONS

First Office Action for CN Patent Application No. 202111164611.6 of Apr. 30, 2025.
Extended European Search Report for EP Patent Application No. 22874910.7 of Jan. 14, 2025.
LG Electronics, "Discussion on PDCCH repetition for URLLC," 3GPP TSG RAN WG1 Meeting #92bis, R1-1804571, Sanya, China, Apr. 16-20, 2018.
Ntt Docomo, Inc., "Necessity of PDCCH repetition," 3GPP TSG RAN WG1 Meeting #92bis, R1-1805063, Sanya, China, Apr. 16-20, 2018.

* cited by examiner

BEHAVIOR DETERMINING METHOD AND APPARATUS, AND RELATED DEVICE

CROSS-REFERENCE TO RELATED APPLICATIONS

This application is a Bypass Continuation Application of PCT International Application No. PCT/CN2022/121732 filed on Sep. 27, 2022, which claims priority to Chinese Patent Application No. 202111164611.6, filed on Sep. 30, 2021 in China, which are incorporated herein by reference in their entireties.

TECHNICAL FIELD

This application pertains to the field of communications technologies, and in particular, to a behavior determining method and apparatus, and a related device.

BACKGROUND

At present, after physical downlink control channel (PDCCH) repetition transmission is introduced, for understanding behaviors of the terminal, such as understanding a PDCCH monitoring behavior of the terminal and a rate matching behavior of a physical downlink shared channel (PDSCH), need to be optimized accordingly, otherwise, the terminal behavior may be ambiguous.

SUMMARY

Embodiments of this application provide a behavior determining method and apparatus, and a related device.

According to a first aspect, a behavior determining method is provided, including:

- obtaining, by a terminal, target information, where the target information is associated with a plurality of candidate resources for physical downlink control channel (PDCCH) repetition transmission; and
- determining, by the terminal, a terminal behavior based on the target information.

According to a second aspect, a behavior determining apparatus is provided, including:

- an obtaining module, configured to obtain target information, where the target information is associated with a plurality of candidate resources for physical downlink control channel (PDCCH) repetition transmission; and
- a determining module, configured to determine a terminal behavior based on the target information.

According to a third aspect, a terminal is provided, where the terminal includes a processor, a memory, and a program or an instruction stored in the memory and executable on the processor, and when the program or the instruction is executed by the processor, steps of the behavior determining method according to the first aspect are implemented.

According to a fourth aspect, a readable storage medium is provided. The readable storage medium stores a program or an instruction, and when the program or the instruction is executed by a processor, steps of the behavior determining method according to the first aspect are implemented.

According to a fifth aspect, a chip is provided, where the chip includes a processor and a communications interface, the communications interface is coupled to the processor, and the processor is configured to run a program or an instruction of a network side device, to implement the behavior determining method according to the first aspect.

According to a sixth aspect, a computer program product is provided, where the computer program product is stored in a storage medium, and the program product is executed by at least one processor to implement steps of the behavior determining method according to the first aspect.

According to a seventh aspect, a communications device is provided, configured to perform steps of the behavior determining method according to the first aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that, the terms used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and the character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, a new radio (NR) system is described in the following description for illustrative purposes, and the NR terminology is used in most of the following description, although these technologies can also be applied to applications other than the NR system application, such as the $6^{th}$ generation (6G) communications system.

Figure 1:
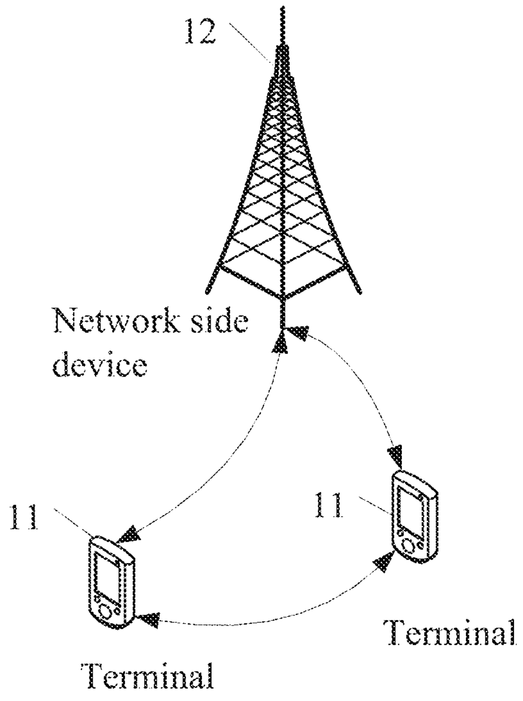
FIG. 1 is a structural diagram of a network system according to an embodiment of this application.

FIG. 1 is a structural diagram of a wireless communications system to which embodiments of this application can be applied. The wireless communications system includes a terminal 11 and a network side device 12. The terminal 11 may also be referred to as a terminal device or user equipment (UE). The terminal 11 may be a terminal side device such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a bracelet, a headset, glasses, and the like. It should be noted that a specific type of the terminal 11 is not limited in the embodiments of this application. The network side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a home NodeB, a home evolved NodeB, a wireless local area network (WLAN) access point, a Wi-Fi node, a transmitting receiving point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

With reference to the accompanying drawings, the following describes in detail a behavior determining method provided in the embodiments of this application by using specific embodiments and application scenarios thereof.

Figure 2:
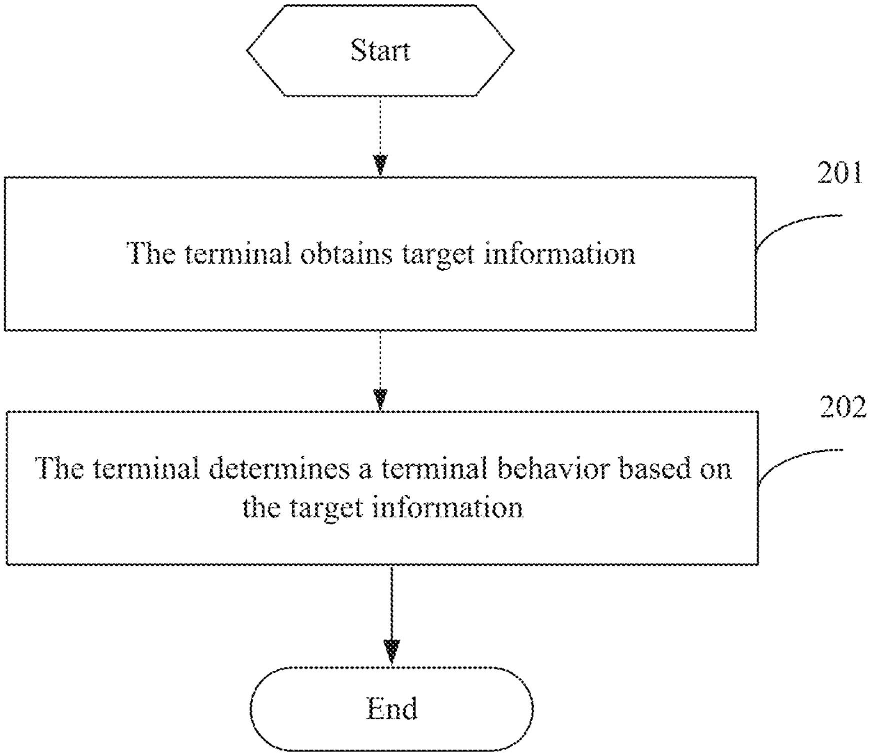
FIG. 2 is a flowchart of a behavior determining method according to an embodiment of this application.

Referring to FIG. 2, FIG. 2 is a flowchart of a behavior determining method according to an embodiment of this application, and the behavior determining method includes the following steps.

Step 201. A terminal obtains target information, where the target information is associated with a plurality of candidate resources for PDCCH repetition transmission. For example, the target information includes downlink control information (DCI) carrying a minimum scheduling slot offset indicator, and the DCI is transmitted on the plurality of candidate resources, or the target information includes configuration information of the plurality of candidate resources, and the configuration information can be dynamically configured or preconfigured by a network side device, which is not limited herein.

Step 202. The terminal determines a terminal behavior based on the target information.

In this embodiment, the terminal obtains target information, where the target information is associated with a plurality of candidate resources for PDCCH repetition transmission; and the terminal determines a terminal behavior based on the target information. The terminal may determine the terminal behavior based on the target information to avoid that the terminal behavior is ambiguous.

In an embodiment of this application, the target information includes DCI carrying a minimum scheduling slot offset indicator, and the DCI is transmitted on the plurality of candidate resources; and the determining, by the terminal, a terminal behavior based on the target information includes:

determining, by the terminal, a scheduling slot delay value of the terminal based on whether a reference PDCCH candidate resource is within first n orthogonal frequency division multiplexing (OFDM) symbols of a current slot, where n is a positive integer, and the reference PDCCH candidate resource is a latest PDCCH candidate resource among the plurality of candidate resources.

In the foregoing description, if the DCI carries the minimum scheduling slot offset indicator, and the DCI is transmitted on a plurality of candidate resources for PDCCH repetition transmission, the terminal can determine different scheduling slot delay values based on whether the reference PDCCH candidate resource is within or outside first N (for example, first three) OFDM symbols of the current slot.

In an implementation, the minimum scheduling slot offset can be used to determine the scheduling slot delay value. In another implementation, the terminal can trigger, based on the DCI carrying the minimum scheduling slot offset indicator, the terminal to determine the scheduling slot delay value, namely, the terminal triggers, based on the target information, the terminal to determine the scheduling slot delay value based on whether a reference PDCCH candidate resource is within first n orthogonal frequency division multiplexing (OFDM) symbols of a current slot.

The latest PDCCH candidate resource is: a candidate resource at a latest start position among the plurality of candidate resources; or a candidate resource at a latest end position among the plurality of candidate resources. For example, the latest PDCCH candidate resource can be determined based on a sequence in which a start OFDM symbol of each PDCCH candidate resource is sent in time, or based on a sequence in which an end position of each PDCCH candidate resource is sent in time.

Further, the scheduling slot delay value of the terminal is a first scheduling slot delay value in a case that the start position or the end position of the reference PDCCH candidate resource is within the first n OFDM symbols of the current slot; and the scheduling slot delay value of the terminal is a second scheduling slot delay value in a case that the start position or the end position of the reference PDCCH candidate resource is outside the first n OFDM symbols of the current slot.

For example, when the start OFDM symbol position of the reference PDCCH candidate resource is within first three OFDM symbols, the first scheduling slot delay value is determined; and when the start OFDM symbol position of the reference PDCCH candidate resource is outside the first three OFDM symbols, the second scheduling slot delay value is determined.

Alternatively, when the end position of the reference PDCCH candidate resource is within the first three OFDM symbols, the first scheduling slot delay value is determined; and when the end position of the reference PDCCH candidate resource is outside the first three OFDM symbols, the second scheduling slot delay value is determined.

In an embodiment of this application, in a case that the terminal is configured with a search space switching function, search spaces corresponding to the plurality of candidate resources respectively have a same search space group index.

In an embodiment of this application, the target information includes a first PDCCH and a second PDCCH, where the first PDCCH carries bandwidth part (BWP) switching information, the second PDCCH carries channel state information (CSI) trigger information, and an activated BWP in which the second PDCCH is located and an activated BWP in which the terminal receives a channel state information-reference signal (CSI-RS) with non-zero power triggered by the second PDCCH are different BWPs.

Specifically, a first PDCCH candidate resource is a latest PDCCH candidate resource among N PDCCH candidate resources configured for and occupied by the first PDCCH, a second PDCCH candidate resource is a latest PDCCH candidate resource among M PDCCH resources configured for and occupied by the second PDCCH, and a third PDCCH candidate resource is an earliest candidate resource among the M PDCCH resources configured for and occupied by the second PDCCH; and an end position (for example, a last OFDM symbol) of a span occupied by the first PDCCH candidate resource is not later than an end position (for example, a last OFDM symbol) of a span occupied by the second PDCCH candidate resource; or an end position of a span occupied by the first PDCCH candidate resource is not later than an end position of a span occupied by the third PDCCH candidate resource, where N is greater than or equal to 1, and M is greater than or equal to 1. N>1 indicates that the first PDCCH is configured with repetition sending; and M>1 indicates that the second PDCCH is configured with repetition sending.

In the foregoing description, the latest PDCCH candidate resource can be determined based on a sequence in which a start OFDM symbol of each PDCCH candidate resource is sent in time, or based on a sequence in which an end position of each PDCCH candidate resource is sent in time. Namely, the latest PDCCH candidate resource among the N PDCCH candidate resources is:

a candidate resource at a latest start position (for example, the start OFDM symbol is the latest in time) among the N PDCCH candidate resources; or a candidate resource at a latest end position (for example, the last OFDM symbol is the latest in time) among the N PDCCH candidate resources; and/or the latest PDCCH candidate resource among the M PDCCH candidate resources is:

a candidate resource at a latest start position (for example, the start OFDM symbol is the latest in time) among the M PDCCH candidate resources; or a candidate resource at a latest end position (for example, the last OFDM symbol is the latest in time) among the M PDCCH candidate resources.

In an embodiment of this application, the determining, by the terminal, a terminal behavior based on the target information includes:

when it is determined, based on the target information, that a fourth PDCCH candidate resource among the plurality of candidate resources overlaps, in time, with a radio frequency switching time of the terminal, or with a time of sending a sounding reference signal (SRS) on another carrier frequency, skipping monitoring, by the terminal, the fourth PDCCH candidate resource, and determining, by the terminal, that a PDCCH configured with detection is repetition transmission.

In the foregoing description, the target information may include configuration information of a plurality of candidate resources, and the configuration information can be dynamically configured or preconfigured by a network side device. It can be determined, based on the target information, that the fourth PDCCH candidate resource overlaps, in time, with a radio frequency switching time of the terminal, or with a time of sending the SRS on another carrier frequency. In this case, the terminal does not monitor the fourth PDCCH candidate resource, and the terminal determines that a PDCCH configured with detection is repetition transmission. The fourth PDCCH candidate resource can be one or more PDCCH candidate resources among the plurality of candidate resources.

In an embodiment of this application, the determining, by the terminal, a terminal behavior based on the target information includes:

when it is determined, based on the target information, that a fifth PDCCH candidate resource among the plurality of candidate resources meets a preset condition, skipping monitoring, by the terminal, the fifth PDCCH candidate resource; and if a time-frequency resource of the fifth PDCCH candidate resource partially overlaps with a time-frequency resource of a PDSCH scheduled in the PDCCH repetition transmission, the terminal demodulates the PDSCH based on at least one of the following:

the terminal considers that an overlapping resource is not used for carrying the PDSCH, and performs rate matching on the overlapping resource;

the terminal considers that an overlapping resource is used for carrying the PDSCH, and does not perform rate matching on the overlapping resource;

if the preset condition is configured through radio resource control (RRC), the terminal considers that an overlapping resource is used for carrying the PDSCH, and does not perform rate matching on the overlapping resource;

if the preset condition is configured through DCI, the terminal considers that an overlapping resource is not used for carrying the PDSCH, and performs rate matching on the overlapping resource;

base on a configuration or an indication of a network side device, the terminal considers that an overlapping resource is not used for carrying the PDSCH, and performs rate matching on the overlapping resource; and base on the configuration or the indicator of the network side device, the terminal considers that an overlapping resource is used for carrying the PDSCH, and does not perform rate matching on the overlapping resource.

The DCI is repeatedly transmitted by occupying a plurality of candidate resources, the time-frequency resource of the PDSCH is scheduled through the DCI, and the fifth PDCCH candidate resource is one or more of the plurality of candidate resources.

In the foregoing description, the terminal may not monitor a specific candidate resource (namely, the fifth PDCCH candidate resource) of the repeatedly sent PDCCH based on the preset condition. If the time-frequency resource configured for the PDCCH candidate resource (including a demodulation reference signal (DMRS) resource of the PDCCH) overlaps with the scheduled PDSCH time-frequency resource, when the terminal receives and demodulates the PDSCH, the terminal may select at least one of the following for demodulation:

a) although the network side device does not actually send the fifth PDCCH candidate resource, the terminal still considers that the overlapping resource is not used to carry the PDSCH sending signal;

b) because the network side device does not actually send the fifth PDCCH candidate resource, the terminal considers that the overlapping resource can be used to carry the PDSCH sending signal;

c) when the preset condition is configured through RRC, select b); and when the preset condition is dynamically configured through DCI, select a); and d) select a) or b) based on a configuration or an indication of the network side device.

Further, the preset condition includes one of the following:

the time-frequency resource of the fifth PDCCH candidate resource overlaps with a time-domain resource of a synchronization signal block (SSB);

the time-frequency resource of the fifth PDCCH candidate resource overlaps with a time-frequency resource of a target resource configured at a higher layer of the network side device;

the time-frequency resource of the fifth PDCCH candidate resource overlaps with a time-frequency resource of an uplink sending signal; and the time-frequency resource of the fifth PDCCH candidate resource overlaps with a radio frequency adjustment time.

In the foregoing description, the target resource includes the following resources configured at a higher layer of the network side device:

RateMatchPattern, lte-CRS-ToMatchAround, LTE-CRS-PatternList-r16, or availableRB-SetPerCell-r16.

In an embodiment of this application, the determining, by the terminal, a terminal behavior based on the target information includes:

determining the terminal behavior when it is determined, based on the target information, that on a monitoring occasion, initial control channel element (CCE) indexes of a PDCCH candidate resource at a first aggregation level and a PDCCH candidate resource at a second aggregation level are the same, a control resource set (CORESET) associated with the PDCCH candidate resource at the first aggregation level and the PDCCH candidate resource at second aggregation level is configured as a non-interleaving function, and the CORESET is configured with m OFDM symbols, where m is a positive integer, and the second aggregation level is higher than the first aggregation level.

The terminal behavior includes at least one of the following:

in a case that a PDCCH at the second aggregation level is configured for repetition transmission, a PDCCH at the first aggregation level is configured for single sending, and initial CCE indexes of a PDCCH candidate resource at the first aggregation level and a PDCCH candidate resource at the second aggregation level are the same on the monitoring occasion, if the terminal performs monitoring successfully based on the first aggregation level, the terminal considers that a successfully monitored PDCCH is the PDCCH at the second aggregation level, and the terminal considers that both the PDCCH candidate resource at the second aggregation level and another PDCCH candidate resource at the second aggregation level in repetition transmission are unable to be used for physical downlink shared channel (PDSCH) signal transmission on a same monitoring occasion;

in a case that a PDCCH at the first aggregation level is configured for repetition transmission, a PDCCH at the second aggregation level is configured for single sending, and initial CCE indexes of a PDCCH candidate resource at the second aggregation level and a PDCCH candidate resource at the first aggregation level are the same on the monitoring occasion, if the terminal performs monitoring successfully based on the first aggregation level, the terminal considers that a successfully monitored PDCCH is the PDCCH at the first aggregation level, and the terminal considers that only a PDCCH time-frequency resource at the first aggregation level is unable to be used for PDSCH signal transmission on the monitoring occasion, or the terminal considers that a PDCCH time-frequency resource at the second aggregation level is unable to be used for PDSCH signal transmission on the monitoring occasion;

in a case that a PDCCH at the first aggregation level is configured for repetition transmission, a PDCCH at the second aggregation level is configured for repetition transmission, and an initial CCE index of one PDCCH candidate resource at the first aggregation level is the same as an initial CCE index of one PDCCH candidate resource at the second aggregation level on at least one monitoring occasion, if the terminal performs monitoring successfully based on the first aggregation level, the terminal considers that a successfully monitored PDCCH is the PDCCH at the second aggregation level, and the terminal considers that both the PDCCH candidate resource at the second aggregation level and another PDCCH candidate resource at the second aggregation level in repetition transmission are unable to be used for PDSCH signal transmission on a same monitoring occasion;

in a case that a PDCCH at the second aggregation level is configured for repetition transmission, a PDCCH at the first aggregation level is configured for single sending, and initial CCE indexes of a PDCCH candidate resource at the first aggregation level and a PDCCH candidate resource at the second aggregation level are the same on the monitoring occasion, the terminal performs monitoring based on only the first aggregation level or the second aggregation level, or the terminal selects a PDCCH at an aggregation level configured for repetition transmission to monitor;

in a case that a PDCCH at the first aggregation level is configured for repetition transmission, a PDCCH at the second aggregation level is configured for single sending, and initial CCE indexes of a PDCCH candidate resource at the second aggregation level and a PDCCH candidate resource at the first aggregation level are the same on the monitoring occasion, the terminal performs monitoring based on only the first aggregation level or the second aggregation level, or the terminal selects a PDCCH at an aggregation level configured for repetition transmission to monitor; and in a case that a PDCCH at the first aggregation level is configured for repetition transmission, a PDCCH at the second aggregation level is configured for repetition transmission, and an initial CCE index of one PDCCH candidate resource at the first aggregation level is the same as an initial CCE index of one PDCCH candidate resource at the second aggregation level on at least one monitoring occasion, the terminal performs monitoring based on only the first aggregation level or the second aggregation level.

In the following, that the first aggregation level is AL8, and the second aggregation level is AL16 is used as an example to illustrate the above embodiment.

When the terminal monitors PDCCH candidate resources of AL8 and AL16, at a specific monitoring occasion, initial CCE indexes of the PDCCH candidate resource of AL8 and the PDCCH candidate resource of AL16 are the same, and a corresponding CORESET is configured with a non-interleaving function and one OFDM symbol, the terminal determines, based on whether the PDCCH candidate resource of AL8 is repeatedly sent and whether the PDCCH candidate resource of AL16 is repeatedly sent, whether these PDCCH candidate resources are used for PDSCH signal transmission. There are several cases as follows:

1) when the PDCCH candidate resource of AL16 is configured for repetition sending, but the PDCCH candidate resource of AL8 is configured for single sending, and has a same initial CCE index with one PDCCH candidate resource of AL16 at a specific monitoring occasion. If the terminal performs monitoring successfully based on the aggregation level of AL8, the terminal considers that a successfully monitored PDCCH is a repetition sending behavior of an aggregation level of AL16, and the terminal considers that both the PDCCH candidate resource of AL16 and another associated PDCCH candidate resource of AL16 in repetition sending are unable to be used for PDSCH signal transmission on a same monitoring occasion;
2) when the PDCCH candidate resource of AL8 is configured for repetition sending, but the PDCCH candidate resource of AL16 is configured for single sending, and has a same initial CCE index with one PDCCH candidate resource of AL8 at a specific monitoring occasion. If the terminal performs monitoring successfully based on the aggregation level of AL8, the terminal considers that a successfully monitored PDCCH is a repetition sending behavior of an aggregation level of AL8, and the terminal considers that only a PDCCH time-frequency resource of AL8 is unable to be used for PDSCH signal transmission on this monitoring occasion, or another PDCCH time-frequency resource interpreted as AL16 is unable to be used for PDSCH signal transmission; and
3) when the PDCCH candidate resource of AL8 is configured for repetition sending, and the PDCCH candidate resource of AL16 is also configured for repetition sending. On at least one monitoring occasion, an initial CCE index of one PDCCH candidate resource of AL8 is the same as an initial CCE index of one PDCCH candidate resource of AL16. If the terminal performs monitoring successfully based on the aggregation level of AL8, the terminal considers that a successfully monitored PDCCH is a repetition sending behavior of an aggregation level of AL16, and the terminal considers that both the PDCCH candidate resource of AL16 and another associated PDCCH candidate resource of AL16 in repetition sending are unable to be used for PDSCH signal transmission on a same monitoring occasion.

In addition, the terminal has the following possible behavior limitations:

behavior 1: in the above three cases, the terminal only expects to select one aggregation level to monitor, for example, only AL8 or AL16, or only selects an aggregation level configured with a PDCCH configured for repetition transmission to monitor (for the above two cases); and behavior 2: the terminal does not expect any of PDCCH repetition of AL8 and PDCCH repetition of AL16 to be configured for repetition sending in the above cases.

In an embodiment of this application, in a case that the terminal does not support a capability of independently monitoring a PDCCH candidate resource, a PDCCH for non-repetition transmission is sent on a sixth PDCCH candidate resource, and the sixth PDCCH candidate resource comes from a search space with a minimum identifier (ID) among at least two associated search spaces for PDCCH repetition transmission.

Specifically, when the network side device learns of that the terminal does not support the capability of independently monitoring a PDCCH candidate resource (the capability can be a terminal reporting or default terminal capability), the terminal expects the network to send a single PDCCH only on a first PDCCH candidate resource, and the first PDCCH candidate resource comes from a search space with a minimum ID among at least two associated search spaces for PDCCH repetition sending.

In an embodiment of this application, L1 candidate resources among the plurality of candidate resources have time overlap, the L1 candidate resources are associated with K CORESETs, and the K CORESETs are associated with different pieces of quasi co-location-typeD (QCL-typeD) information; and if the terminal receives a PDCCH on a current symbol and receives a CSI-RS resource on the current symbol, and a CSI-RS set associated with the CSI-RS resource is configured to enable and close a repetition sending parameter, then the QCL-typeD information of the CSI-RS is the same as QCL-typeD information of a target reference CORESET in the K CORESETs, where the current symbol is a symbol in the time overlap, and the L1 candidate resources include at least two candidate resources carrying the same DCI, or the L1 candidate resources include at least two candidate resources carrying different pieces of DCI; and L1 is an integer greater than 1, K is an integer greater than 1, and L1 is greater than or equal to K.

In the foregoing description, L1 candidate resources are associated with K CORESETs, which can be understood as that each candidate resource in the L1 candidate resources is associated with one CORESET, and CORESETs associated with different candidate resources can be the same or different.

In the foregoing description, the L1 candidate resources are all candidate resources for PDCCH repetition transmission, but are not necessarily used for PDCCH repetition transmission of the same purpose. The L1 candidate resources include at least two candidate resources carrying the same DCI, or the L1 candidate resources include at least two candidate resources carrying different pieces of DCI. At least two candidate resources carrying the same DCI can be understood as PDCCH repetition transmission for the same purpose, and at least two candidate resources carrying different pieces of DCI can be understood as PDCCH repetition transmission for different purposes.

In an embodiment of this application, a target PDCCH resource has time overlap with L2 candidate resources among the plurality of candidate resources, the target PDCCH resource and the L2 candidate resources are associated with K CORESETs, and the K CORESETs are associated with different pieces of QCL-typeD information; and if the terminal receives a PDCCH on a current symbol and receives a CSI-RS resource on the current symbol, and a CSI-RS set associated with the CSI-RS resource is configured to enable and close a repetition sending parameter, then the QCL-typeD information of the CSI-RS is the same as QCL-typeD information of a target reference CORESET in the K CORESETs, where the target PDCCH resource is a candidate resource that is not used for PDCCH repetition transmission, the current symbol is a symbol in the time overlap, and at least one candidate resource of the target PDCCH resource and the L2 candidate resources carries same DCI, or at least one candidate resource of the target PDCCH resource and the L2 candidate resources carries different pieces of DCI; and L2 is a positive integer, and K is an integer greater than 1.

In the foregoing description, the target PDCCH resource and the L2 candidate resources are associated with K CORESETs, which can be understood as that each resource of the target PDCCH resource and the L2 candidate resources is associated with a CORESET, and CORESETs associated with different resources can be the same or different.

In the foregoing description, the L2 candidate resources are all candidate resources for PDCCH repetition transmission, and the target PDCCH resource and the L2 candidate resources are not necessarily used for PDCCH repetition transmission of the same purpose. At least one candidate resource of the target PDCCH resource and the L2 candidate resources carries same DCI, or at least one candidate resource of the target PDCCH resource and the L2 candidate resources carries different pieces of DCI. At least two candidate resources carrying the same DCI can be understood as PDCCH repetition transmission for the same purpose, and at least two candidate resources carrying different pieces of DCI can be understood as PDCCH repetition transmission for different purposes.

Further, in a case that the current symbol is within a preset default receiving beam time threshold, the QCL-typeD information of the PDSCH received by the terminal on the current symbol is the same as the QCL-typeD information of the target reference CORESET among K CORESETs, where the target reference CORESET is a CORESET with a minimum identifier among K CORESETs.

The following describes the implementations provided in this application with reference to examples.

Implementation 1: when UE detects a DCI format 0_1 or 1_1 including a minimum applicable scheduling offset indicator field, a currently valid K0min and K2 min will remain valid until the K0min and K2 min indicated by the minimum applicable scheduling offset indicator field take effect.

When the UE detects a DCI format 0_1 or 1_1 including the minimum applicable scheduling offset indicator field on an $n^{th}$ slot, and the DCI indicates target activated downlink or uplink BWP switch of a serving cell, K0min (K2 min) indicated by the DCI is associated with the target activated BWP, and K0min (K2 min) indicated by the DCI takes effect from a slot corresponding to K0/K2 indicated by a TDRA domain of the DCI.

When the UE detects the DCI format 0_1 or 1_1 including the minimum applicable scheduling offset indicator field on the $nt^h$ slot, and the DCI does not indicate target activated downlink or uplink BWP switch of the serving cell, K0min (K2 min) indicated by the DCI takes effect in an $(n+X)^{th}$ slot of a scheduling cell. From an (n+1)th slot to an $(n+X)^{th}$ slot, the UE does not expect to receive another DCI indicating change of the K0min (K2 min) value of a same activated BWP in a scheduled cell.

When the DCI indicating the change of K0min (K2 min) is located in first three OFDM symbols of a slot n, a value X of an application delay of the new K0min (K2 min) is calculated according to the following formula (1).

$$X = \max\left(\left\lceil K_{0minOld} \cdot \frac{2^{\mu_{PDCCH}}}{2^{\mu_{PDSCH}}} \right\rceil, Z_\mu\right), \tag{1}$$

where

K0minOld is a currently effective K0min value of the activated downlink BWP of the scheduled cell, and if the base station is not configured with this value, K0min is equal to 0. Zμ is determined by a subcarrier interval value p of a scheduling cell activated downlink BWP in the $nt^h$ slot. Refer to Table 1 below for a specific correspondence. μPDCCH and pPDSCH are a PDCCH subcarrier interval of the scheduling cell activated downlink BWP in the $nt^h$ slot and a PDSCH subcarrier interval of a scheduled cell activated downlink BWP in the $nt^h$ slot respectively.

In cross-carrier scheduling, if the scheduling cell indicates the change of K0min or K2 min of the scheduled cell in the slot n, and then the downlink activated BWP is switched in the scheduling cell before the slot n+X, a slot when the new K0min and/or K2 min value starts to take effect is not earlier than a start moment of the slot n+X, where the value of X is determined according to the above formula (1), and pPDCCH of formula (1) is determined by the scheduling cell in the subcarrier interval of the activated downlink carrier in the slot n.

When the DCI indicating the change of K0min or K2 min is located in other symbols than the first three symbols of the slot n, in order to compensate for the effect that the symbol occupied by the PDCCH is relative late in the slot, the value X of the application delay of the new K0min or K2 min is obtained by adding 1 to the value obtained through Expression 1 (as shown in Expression 2 below).

$$X = \max\left(\left\lceil K_{0minOld} \cdot \frac{2^{\mu_{PDCCH}}}{2^{\mu_{PDSCH}}} \right\rceil, Z_\mu\right) + 1 \tag{2}$$

TABLE 1

| μ | $Z_\mu$ |
|---|---|
| 0 | 1 |
| 1 | 1 |
| 2 | 2 |
| 3 | 2 |

Figure 3A:
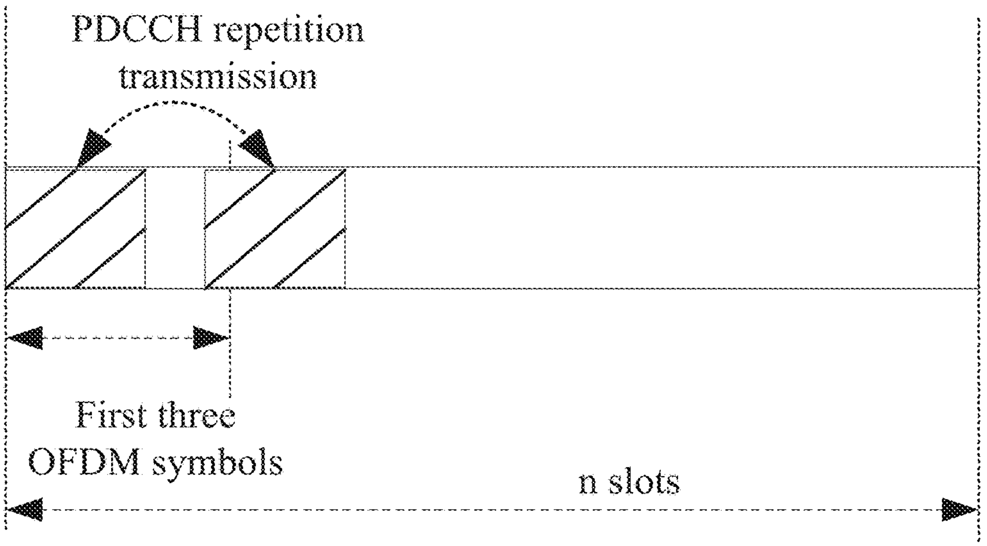
FIG. 3*a* to FIG. 3*h* are schematic diagrams of a resource relationship according to an embodiment of this application.

When the DCI carries the minimum scheduling slot offset indicator, and the DCI is transmitted through PDCCH repetition (as shown in FIG. 3*a*), different scheduling slot delay values are determined based on whether the reference PDCCH candidate resource is within or outside first three OFDM symbols of the current slot. The reference PDCCH candidate resource refers to a PDCCH candidate resource which is sent latest in time among the PDCCH repetition sending candidate resources, where the method for comparing which is later in sending time may be based on a sequence of sending an initial OFDM symbol of each PDCCH repetition candidate resource in time or a sequence of sending a last OFDM symbol of each PDCCH repetition candidate resource in time. In FIG. 3*a*, a second repetition PDCCH candidate resource is used as the reference PDCCH candidate resource because it was sent late in time. Then it is determined whether the reference PDCCH candidate resource is within or outside the first three OFDM symbols. Based on the last OFDM symbol of the PDCCH candidate resource, it can be seen from FIG. 3*a* that the last OFDM symbol of the PDCCH candidate resource has exceeded the first three OFDM symbols, so the second scheduling slot delay value, that is, the value determined according to Formula (2) in the foregoing description, is executed.

Implementation 2:

When the first PDCCH carries BWP switching information, and the second PDCCH carries one piece of CSI trigger information, there are two methods.

Figure 3B:
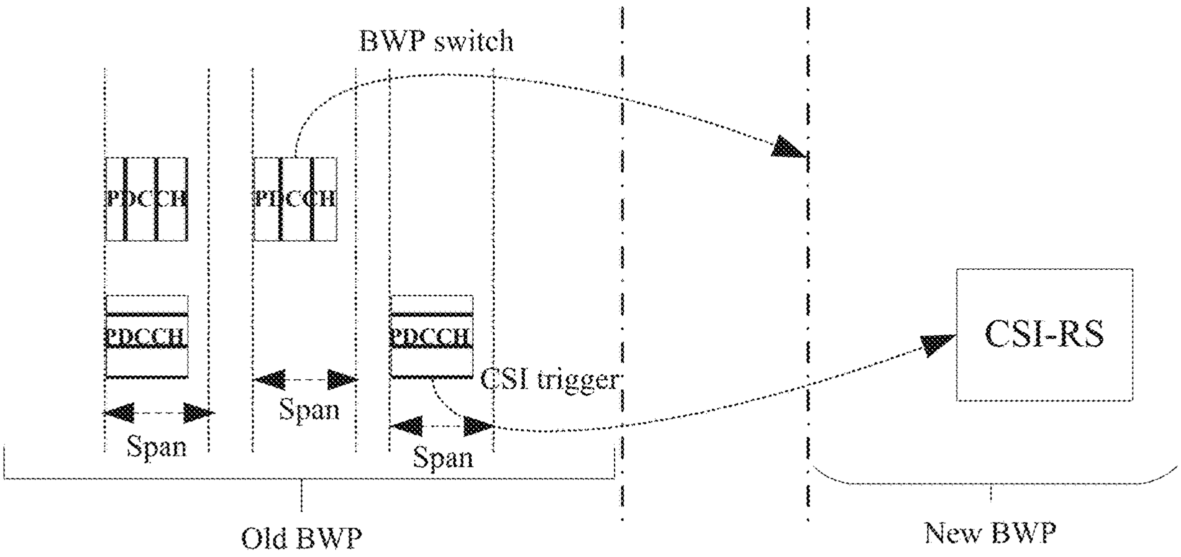

Method 1: As shown in FIG. 3*b*, in time, the last OFDM symbol of the span occupied by the latter one of the two PDCCH candidate resources occupied by the first PDCCH cannot be later than the last OFDM symbol of the span occupied by the latter one of the two PDCCH candidate resources occupied by the second PDCCH.

Figure 3C:
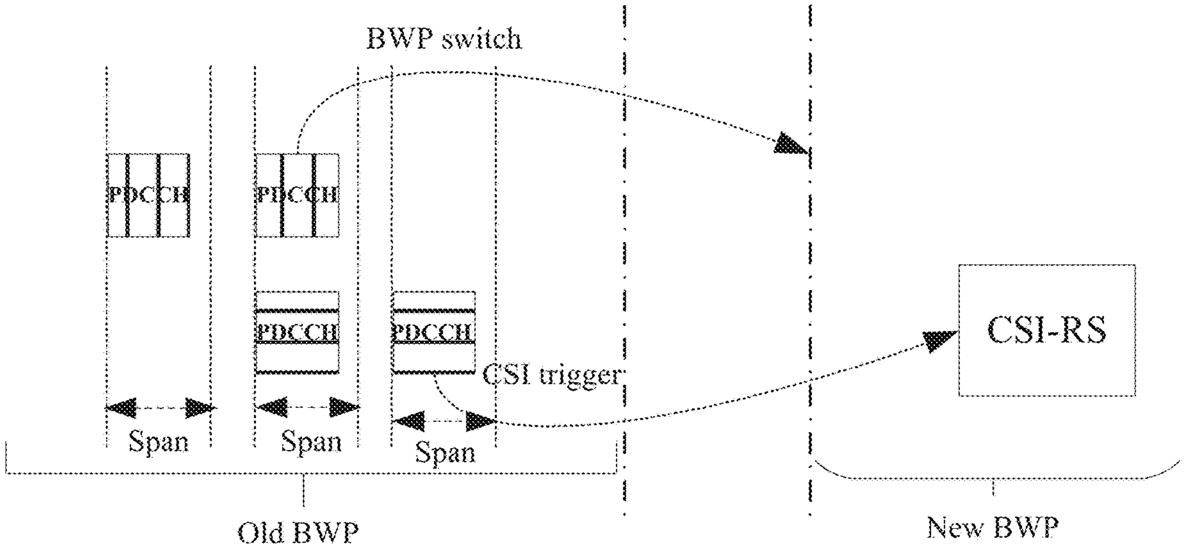

Method 2: As shown in FIG. 3*c*, in time, the last OFDM symbol of the span occupied by the latter one of the two PDCCH candidate resources occupied by the first PDCCH cannot be later than the last OFDM symbol of the span occupied by the earlier one of the two PDCCH candidate resources occupied by the second PDCCH.

Figure 3D:
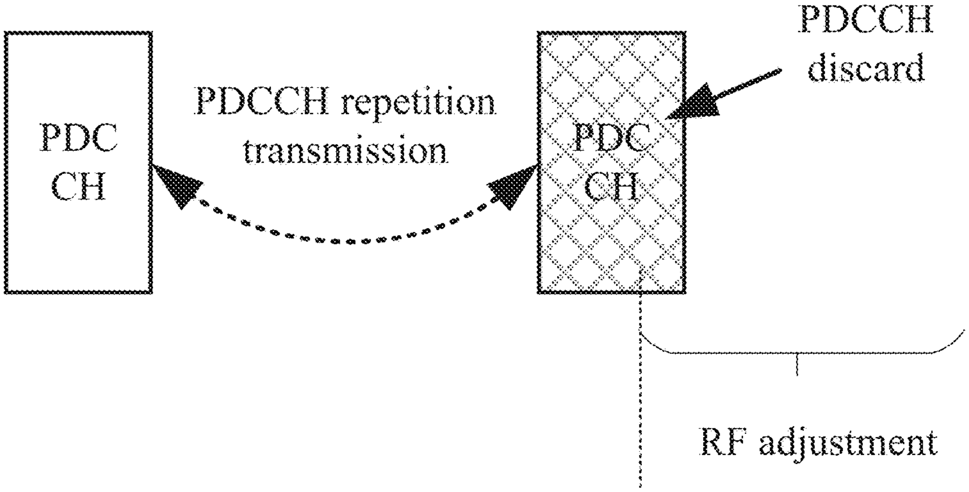

Implementation 3:

As shown in FIG. 3*d*, two associated PDCCHs are repeatedly sent, and the second PDCCH repetition candidate resource conflicts with a radio frequency adjustment time of the terminal (the reason for radio frequency adjustment may be that the terminal enters carrier frequency switching or BWP switching in this case). In this case, the terminal no longer receives the second PDCCH repetition candidate resource, but the terminal only receives the first PDCCH repetition candidate resource. The terminal still considers that the monitored PDCCH is a repetition sending behavior, and it does not affect the rule that the network or the terminal calculates a blind detection ability in advance.

Figure 3E:
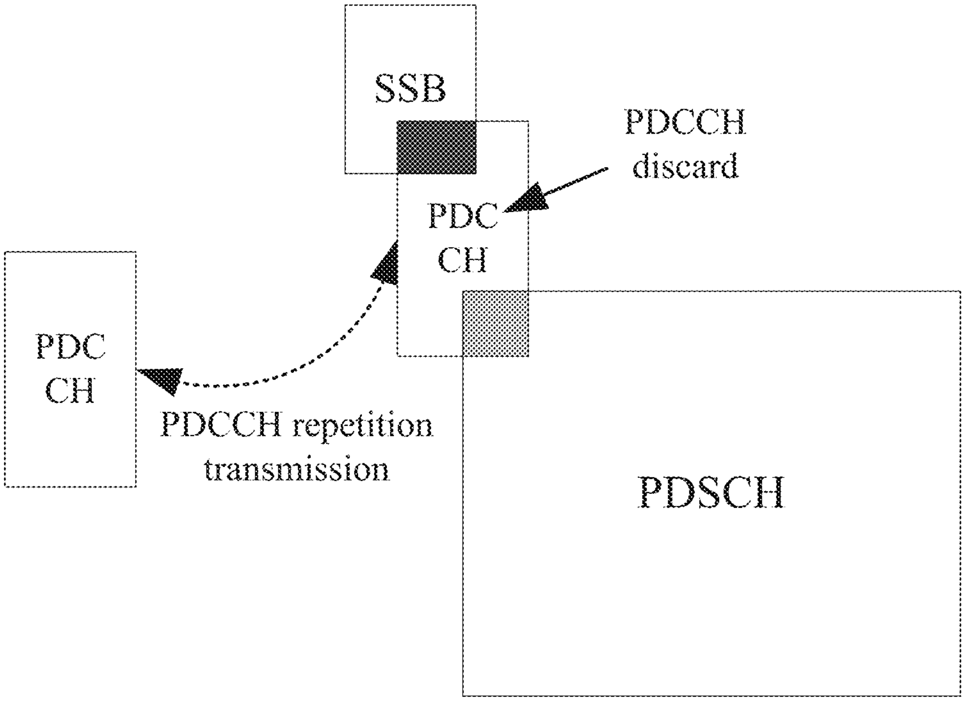

Implementation 4:

As shown in FIG. 3*e*, two associated PDCCHs are repeatedly sent, and time-frequency resources of the second PDCCH repetition candidate resource and the SSB overlap, so the terminal will not monitor the PDCCH on this candidate resource. Therefore, it can be assumed that the base station will not send the PDCCH on this candidate resource either, but only on the first repetition candidate resource. Because some scheduled PDSCH time-frequency resources in DCI overlap with the second PDCCH repetition candidate resource, as shown in the gray position in the figure. When the terminal receives the PDSCH, there may be two hypotheses to whether the PDSCH information is sent in the gray position.

Solution 1: The PDSCH performs rate matching for the gray position in the figure (that is, the position where the PDCCH and the PDSCH overlap in FIG. 3*e*).

Solution 2: The PDSCH does not perform rate matching for the gray position in the figure.

Figure 3F:
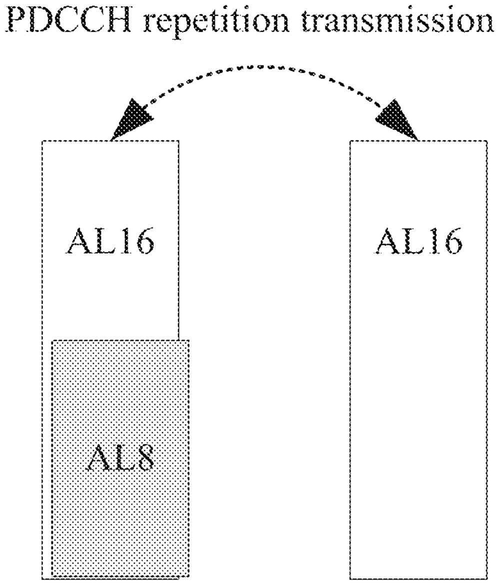
Figure 3G:
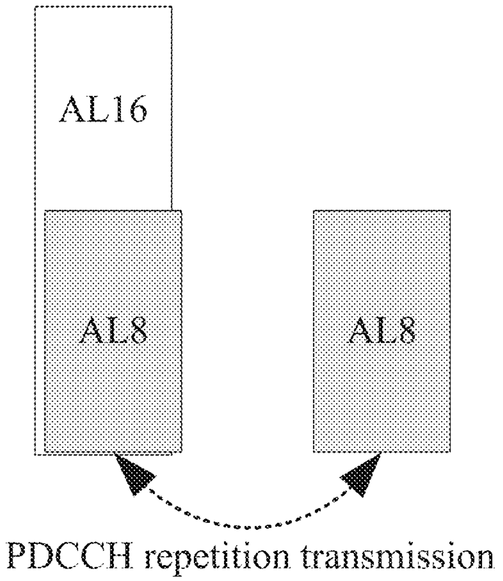
Figure 3H:
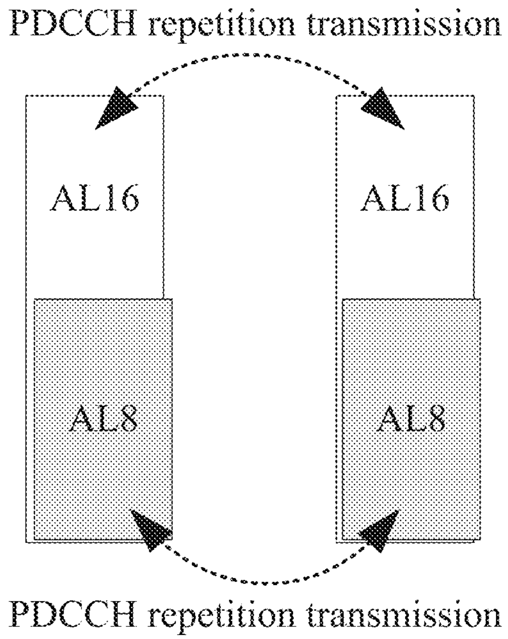

Implementation 5:

When the terminal monitors PDCCH candidate resources at the aggregation level of AL8 and the aggregation level of AL16, at a specific monitoring occasion, initial CCE indexes of the PDCCH candidate resource of AL8 and the PDCCH candidate resource of AL16 are the same, and a corresponding CORESET is configured with a non-interleaving function and one OFDM symbol, the terminal determines, based on whether the PDCCH candidate resource of AL8 is repeatedly sent and whether the PDCCH candidate resource of AL16 is repeatedly sent, whether these PDCCH candidate resources are used for PDSCH signal transmission. There are several scenarios as follows:

I. when the PDCCH candidate resource of AL16 is configured for repetition sending, but the PDCCH candidate resource of AL8 is configured for single sending, and has a same initial CCE index with one PDCCH candidate resource of AL16 at a specific monitoring occasion. If the terminal performs monitoring successfully based on the aggregation level of AL8, the terminal considers that a successfully monitored PDCCH is a repetition sending behavior of an aggregation level of AL16, and the terminal considers that both the PDCCH candidate resource of AL16 and another associated PDCCH candidate resource of AL16 in repetition sending are unable to be used for PDSCH signal transmission on a same monitoring occasion (as shown in FIG. 3*f*);

II. when the PDCCH candidate resource of AL8 is configured for repetition sending, but the PDCCH candidate resource of AL16 is configured for single sending, and has a same initial CCE index with one PDCCH candidate resource of AL8 at a specific monitoring occasion. If the terminal performs monitoring successfully based on the aggregation level of AL8, the terminal considers that a successfully monitored PDCCH is a repetition sending behavior of an aggregation level of AL8, and the terminal considers that only a PDCCH time-frequency resource of AL8 is unable to be used for PDSCH signal transmission on this monitoring occasion, or another PDCCH time-frequency resource interpreted as AL16 is unable to be used for PDSCH signal transmission (as shown in FIG. 3*g*); and III. when the PDCCH candidate resource of AL8 is configured for repetition sending, and the PDCCH candidate resource of AL16 is also configured for repetition sending. On at least one monitoring occasion, an initial CCE index of one PDCCH candidate resource of AL8 is the same as an initial CCE index of one PDCCH candidate resource of AL16. If the terminal performs monitoring successfully based on the aggregation level of AL8, the terminal considers that a successfully monitored PDCCH is a repetition sending behavior of an aggregation level of AL16, and the terminal considers that both the PDCCH candidate resource of AL16 and another associated PDCCH candidate resource of AL16 in repetition sending are unable to be used for PDSCH signal transmission on a same monitoring occasion (as shown in FIG. 3*h*).

Further, in order to avoid complicated solutions in the above three scenarios, the terminal also has the following possible behavior limitations:

in the above three scenarios, the terminal only expects to select one aggregation level to monitor, for example, only AL8 or AL16, or in the first two scenarios, only selects an aggregation level configured with PDCCH repetition to monitor.

It should be noted that the behavior determining method provided in this embodiment of this application may be performed by a behavior determining apparatus, or a control module that is in the behavior determining apparatus and that is configured to perform the behavior determining method.

In the following embodiment, that the behavior determining apparatus performs the behavior determining method is used as an example to describe the behavior determining apparatus provided in the embodiments of this application.

Figure 4:
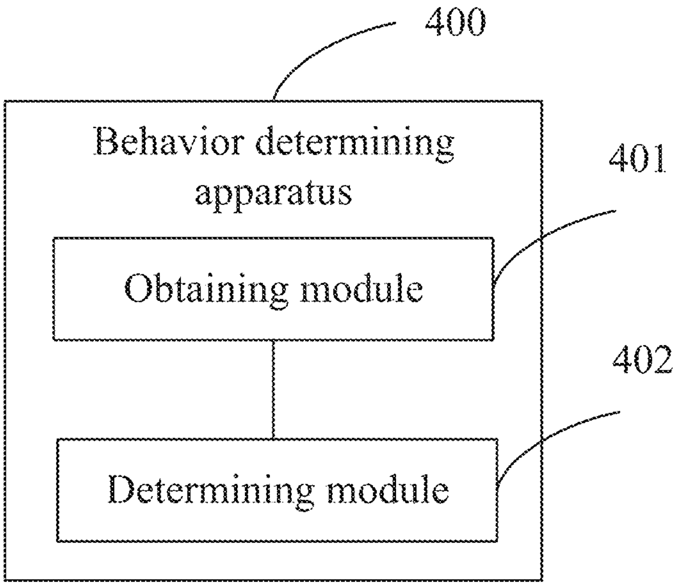
FIG. 4 is a structural diagram of a behavior determining apparatus according to an embodiment of this application.

Referring to FIG. 4, FIG. 4 is a structural diagram of a behavior determining apparatus according to an embodiment of this application, and the behavior determining apparatus 400 includes:

an obtaining module 401, configured to obtain target information, where the target information is associated with a plurality of candidate resources for physical downlink control channel (PDCCH) repetition transmission; and a determining module 402, configured to determine a terminal behavior based on the target information.

Further, the target information includes downlink control information (DCI) carrying a minimum scheduling slot offset indicator, and the DCI is transmitted on the plurality of candidate resources; and correspondingly, the determining module 402 is configured to determine a scheduling slot delay value of the terminal based on whether a reference PDCCH candidate resource is within first n orthogonal frequency division multiplexing (OFDM) symbols of a current slot, where n is a positive integer, where the reference PDCCH candidate resource is a latest PDCCH candidate resource among the plurality of candidate resources.

Further, the target information includes DCI carrying a minimum scheduling slot offset indicator, and the DCI is transmitted on the plurality of candidate resources; and correspondingly, the determining module 402 is configured to trigger the terminal to determine a scheduling slot delay value based on whether a reference PDCCH candidate resource is within first n orthogonal frequency division multiplexing (OFDM) symbols of a current slot, where n is a positive integer, where the reference PDCCH candidate resource is a latest PDCCH candidate resource among the plurality of candidate resources.

Further, the latest PDCCH candidate resource is:

a candidate resource at a latest start position among the plurality of candidate resources; or a candidate resource at a latest end position among the plurality of candidate resources.

Further, the scheduling slot delay value of the terminal is a first scheduling slot delay value in a case that the start position or the end position of the reference PDCCH candidate resource is within the first n OFDM symbols of the current slot; and the scheduling slot delay value of the terminal is a second scheduling slot delay value in a case that the start position or the end position of the reference PDCCH candidate resource is outside the first n OFDM symbols of the current slot.

Further, in a case that the terminal is configured with a search space switching function, search spaces corresponding to the plurality of candidate resources respectively have a same search space group index.

Further, the target information includes a first PDCCH and a second PDCCH, where the first PDCCH carries bandwidth part (BWP) switching information, the second PDCCH carries channel state information (CSI) trigger information, and an activated BWP in which the second PDCCH is located and an activated BWP in which the terminal receives a channel state information-reference signal (CSI-RS) with non-zero power triggered by the second PDCCH are different BWPs.

Further, a first PDCCH candidate resource is a latest PDCCH candidate resource among N PDCCH candidate resources configured for and occupied by the first PDCCH, a second PDCCH candidate resource is a latest PDCCH candidate resource among M PDCCH resources configured for and occupied by the second PDCCH, and a third PDCCH candidate resource is an earliest candidate resource among the M PDCCH resources configured for and occupied by the second PDCCH; and an end position of a span occupied by the first PDCCH candidate resource is not later than an end position of a span occupied by the second PDCCH candidate resource; or an end position of a span occupied by the first PDCCH candidate resource is not later than an end position of a span occupied by the third PDCCH candidate resource, where N is greater than or equal to 1, and M is greater than or equal to 1.

Further, the latest PDCCH candidate resource among the N PDCCH candidate resources is:

a candidate resource at a latest start position among the N PDCCH candidate resources; or a candidate resource at a latest end position among the N PDCCH candidate resources; and/or the latest PDCCH candidate resource among the M PDCCH candidate resources is:

a candidate resource at a latest start position among the M PDCCH candidate resources; or a candidate resource at a latest end position among the M PDCCH candidate resources.

Further, the determining module 402 is configured to: when it is determined, based on the target information, that a fourth PDCCH candidate resource among the plurality of candidate resources overlaps, in time, with a radio frequency switching time of the terminal, or with a time of sending a sounding reference signal (SRS) on another carrier frequency, skip monitoring the fourth PDCCH candidate resource, and the terminal determines that a PDCCH configured with detection is repetition transmission.

Further, the determining module 402 is configured to: when it is determined, based on the target information, that a fifth PDCCH candidate resource among the plurality of candidate resources meets a preset condition, skip monitoring the fifth PDCCH candidate resource; and if a time-frequency resource of the fifth PDCCH candidate resource partially overlaps with a time-frequency resource of a PDSCH scheduled in the PDCCH repetition transmission, the terminal demodulates the PDSCH based on at least one of the following:

the terminal considers that an overlapping resource is not used for carrying the PDSCH, and performs rate matching on the overlapping resource;

the terminal considers that an overlapping resource is used for carrying the PDSCH, and does not perform rate matching on the overlapping resource;

if the preset condition is configured through radio resource control (RRC), the terminal considers that an overlapping resource is used for carrying the physical downlink shared channel (PDSCH), and does not perform rate matching on the overlapping resource;

if the preset condition is configured through DCI, the terminal considers that an overlapping resource is not used for carrying the PDSCH, and performs rate matching on the overlapping resource;

base on a configuration or an indication of a network side device, the terminal considers that an overlapping resource is not used for carrying the PDSCH, and performs rate matching on the overlapping resource; and base on the configuration or the indicator of the network side device, the terminal considers that an overlapping resource is used for carrying the PDSCH, and does not perform rate matching on the overlapping resource.

Further, the preset condition includes one of the following:

the time-frequency resource of the fifth PDCCH candidate resource overlaps with a time-domain resource of a synchronization signal block (SSB);

the time-frequency resource of the fifth PDCCH candidate resource overlaps with a time-frequency resource of a target resource configured at a higher layer of the network side device;

the time-frequency resource of the fifth PDCCH candidate resource overlaps with a time-frequency resource of an uplink sending signal; and the time-frequency resource of the fifth PDCCH candidate resource overlaps with a radio frequency adjustment time.

Further, the determining module 402 is configured to determine the terminal behavior when it is determined, based on the target information, that on a monitoring occasion, initial control channel element (CCE) indexes of a PDCCH candidate resource at a first aggregation level and a PDCCH candidate resource at a second aggregation level are the same, a control resource set (CORESET) associated with the PDCCH candidate resource at the first aggregation level and the PDCCH candidate resource at second aggregation level is configured as a non-interleaving function, and the CORESET is configured with m OFDM symbols, where m is a positive integer, and the second aggregation level is higher than the first aggregation level.

Further, the terminal behavior includes at least one of the following:

in a case that a PDCCH at the second aggregation level is configured for repetition transmission, a PDCCH at the first aggregation level is configured for single sending, and initial CCE indexes of a PDCCH candidate resource at the first aggregation level and a PDCCH candidate resource at the second aggregation level are the same on the monitoring occasion, if the terminal performs monitoring successfully based on the first aggregation level, the terminal considers that a successfully monitored PDCCH is the PDCCH at the second aggregation level, and the terminal considers that both the PDCCH candidate resource at the second aggregation level and another PDCCH candidate resource at the second aggregation level in repetition transmission are unable to be used for PDSCH signal transmission on a same monitoring occasion;

in a case that a PDCCH at the first aggregation level is configured for repetition transmission, a PDCCH at the second aggregation level is configured for single sending, and initial CCE indexes of a PDCCH candidate resource at the second aggregation level and a PDCCH candidate resource at the first aggregation level are the same on the monitoring occasion, if the terminal performs monitoring successfully based on the first aggregation level, the terminal considers that a successfully monitored PDCCH is the PDCCH at the first aggregation level, and the terminal considers that only a PDCCH time-frequency resource at the first aggregation level is unable to be used for PDSCH signal transmission on the monitoring occasion, or the terminal considers that a PDCCH time-frequency resource at the second aggregation level is unable to be used for PDSCH signal transmission on the monitoring occasion;

in a case that a PDCCH at the first aggregation level is configured for repetition transmission, a PDCCH at the second aggregation level is configured for repetition transmission, and an initial CCE index of one PDCCH candidate resource at the first aggregation level is the same as an initial CCE index of one PDCCH candidate resource at the second aggregation level on at least one monitoring occasion, if the terminal performs monitoring successfully based on the first aggregation level, the terminal considers that a successfully monitored PDCCH is the PDCCH at the second aggregation level, and the terminal considers that both the PDCCH candidate resource at the second aggregation level and another PDCCH candidate resource at the second aggregation level in repetition transmission are unable to be used for PDSCH signal transmission on a same monitoring occasion;

in a case that a PDCCH at the second aggregation level is configured for repetition transmission, a PDCCH at the first aggregation level is configured for single sending, and initial CCE indexes of a PDCCH candidate resource at the first aggregation level and a PDCCH candidate resource at the second aggregation level are the same on the monitoring occasion, the terminal performs monitoring based on only the first aggregation level or the second aggregation level, or the terminal selects a PDCCH at an aggregation level configured for repetition transmission to monitor;

in a case that a PDCCH at the first aggregation level is configured for repetition transmission, a PDCCH at the second aggregation level is configured for single sending, and initial CCE indexes of a PDCCH candidate resource at the second aggregation level and a PDCCH candidate resource at the first aggregation level are the same on the monitoring occasion, the terminal performs monitoring based on only the first aggregation level or the second aggregation level, or the terminal selects a PDCCH at an aggregation level configured for repetition transmission to monitor; and in a case that a PDCCH at the first aggregation level is configured for repetition transmission, a PDCCH at the second aggregation level is configured for repetition transmission, and an initial CCE index of one PDCCH candidate resource at the first aggregation level is the same as an initial CCE index of one PDCCH candidate resource at the second aggregation level on at least one monitoring occasion, the terminal performs monitoring based on only the first aggregation level or the second aggregation level.

Further, in a case that the terminal does not support a capability of independently monitoring a PDCCH candidate resource, a PDCCH for non-repetition transmission is sent on a sixth PDCCH candidate resource, and the sixth PDCCH candidate resource comes from a search space with a minimum identifier (ID) among at least two associated search spaces for PDCCH repetition transmission.

Further, L1 candidate resources among the plurality of candidate resources have time overlap, the L1 candidate resources are associated with K CORESETs, and the K CORESETs are associated with different pieces of quasi co-location (QCL)-typeD information; and if the terminal receives a PDCCH on a current symbol and receives a CSI-RS resource on the current symbol, and a CSI-RS set associated with the CSI-RS resource is configured to enable and close a repetition sending parameter, then the QCL-typeD information of the CSI-RS is the same as QCL-typeD information of a target reference CORESET in the K CORESETs, where the current symbol is a symbol in the time overlap, and the L1 candidate resources include at least two candidate resources carrying the same DCI, or the L1 candidate resources include at least two candidate resources carrying different pieces of DCI; and L1 is an integer greater than 1, K is an integer greater than 1, and L1 is greater than or equal to K.

Further, a target PDCCH resource has time overlap with L2 candidate resources among the plurality of candidate resources, the target PDCCH resource and the L2 candidate resources are associated with K CORESETs, and the K CORESETs are associated with different pieces of QCL-typeD information; and if the terminal receives a PDCCH on a current symbol and receives a CSI-RS resource on the current symbol, and a CSI-RS set associated with the CSI-RS resource is configured to enable and close a repetition sending parameter, then the QCL-typeD information of the CSI-RS is the same as QCL-typeD information of a target reference CORESET in the K CORESETs, where the target PDCCH resource is a candidate resource that is not used for PDCCH repetition transmission, the current symbol is a symbol in the time overlap, and at least one candidate resource of the target PDCCH resource and the L2 candidate resources carries same DCI, or at least one candidate resource of the target PDCCH resource and the L2 candidate resources carries different pieces of DCI; and L2 is a positive integer, and K is an integer greater than 1.

Further, in a case that the current symbol is within a preset default receiving beam time threshold, the QCL-typeD information of the PDSCH received by the terminal on the current symbol is the same as the QCL-typeD information of the target reference CORESET among K CORESETs.

Further, the target reference CORESET is a CORESET with a minimum identifier among the K CORESETs.

The behavior determining apparatus 400 in this embodiment of this application may be an apparatus, or may be a component, an integrated circuit, or a chip in a terminal.

The behavior determining apparatus 400 in this embodiment of this application may be an apparatus with an operating system. The operating system may be an Android operating system, may be an iOS operating system, or may be another possible operating system. This is not specifically limited in this embodiment of this application.

The behavior determining apparatus 400 provided in this embodiment of this application can implement the processes implemented in the method embodiment of FIG. 2, and a same technical effect can be achieved. To avoid repetition, details are not described herein again.

Figure 5:
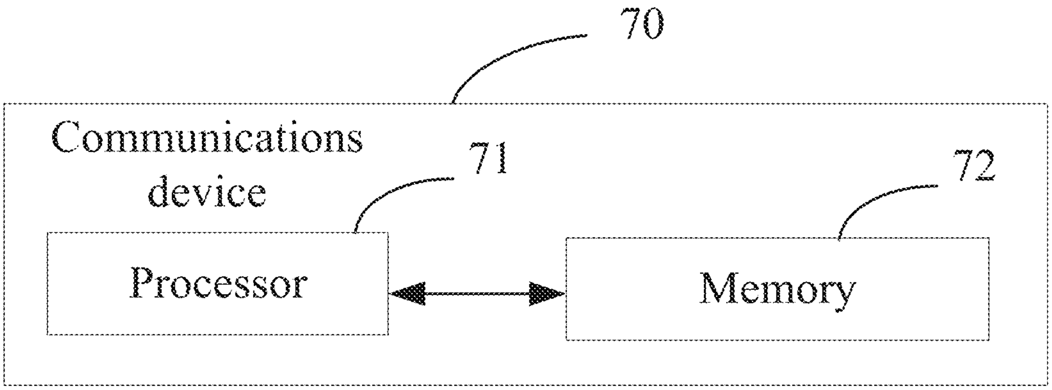
FIG. 5 is a structural diagram of a communications device according to an embodiment of this application.

Optionally, as shown in FIG. 5, an embodiment of this application further provides a communications device 70, including a processor 71, a memory 72, and a program or an instruction stored in the memory 72 and executable on the processor 71. For example, in a case that the communications device 70 is a terminal, when the program or the instruction is executed by the processor 71, the processes of the foregoing embodiments of the behavior determining method in FIG. 2 are implemented, and a same technical effect can be achieved.

Figure 6:
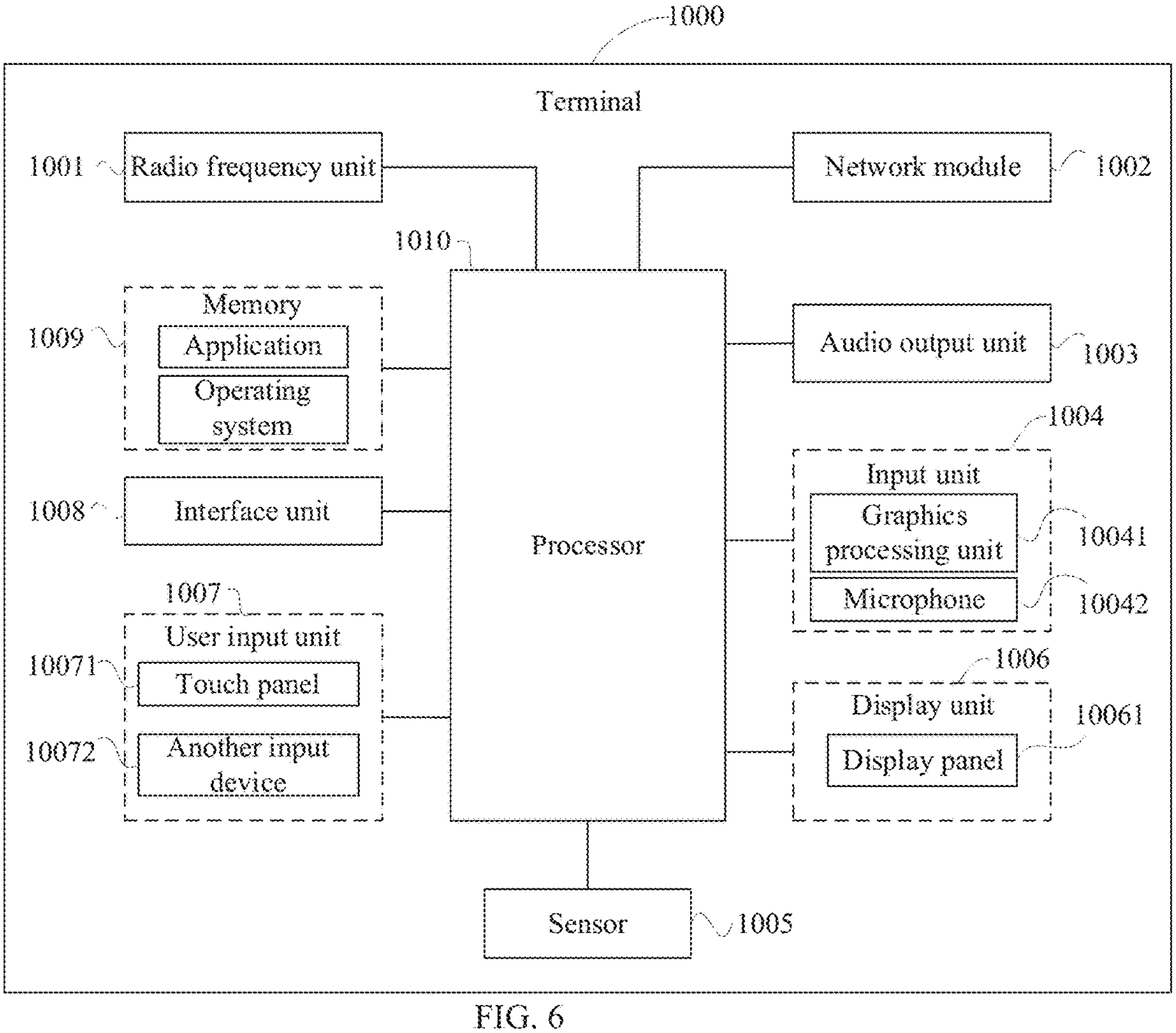
FIG. 6 is a structural diagram of a terminal according to an embodiment of this application.

FIG. 6 is a schematic diagram of a hardware structure of a terminal according to an embodiment of this application.

A terminal 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understand that the terminal 1000 may further include a power supply (such as a battery) that supplies power to each component. The power supply may be logically connected to the processor 1010 by using a power supply management system, to implement functions such as charging and discharging management, and power consumption management by using the power supply management system. The terminal structure shown in FIG. 6 constitutes no limitation on the terminal, and the terminal may include more or fewer components than those shown in the figure, or combine some components, or have different component arrangements. Details are not described herein.

It should be understood that, in this embodiment of this application, the input unit 1004 may include a graphics processing unit (GPU) 10041 and a microphone 10042, and the graphics processing unit 10041 processes image data of a still picture or a video obtained by an image capture apparatus (such as a camera) in a video capture mode or an image capture mode. The display unit 1006 may include a display panel 10061. Optionally, the display panel 10061 may be configured in a form such as a liquid crystal display or an organic light-emitting diode. The user input unit 1007 includes a touch panel 10071 and another input device 10072. The touch panel 10071 is also referred to as a touchscreen. The touch panel 10071 may include two parts: a touch detection apparatus and a touch controller. The another input device 10072 may include but is not limited to a physical keyboard, a functional button (such as a volume control button or a power on/off button), a trackball, a mouse, and a joystick. Details are not described herein.

In this embodiment of this application, after receiving downlink data from a network side device, the radio frequency unit 1001 sends the downlink data to the processor 1010 for processing, and sends uplink data to the base station. Usually, the radio frequency unit 1001 includes but is not limited to an antenna, at least one amplifier, a transceiver, a coupler, a low noise amplifier, a duplexer, and the like.

The memory 1009 may be configured to store a software program or an instruction and various data. The memory 1009 may mainly include a program or instruction storage area and a data storage area. The program or instruction storage area may store an operating system, an application or an instruction required by at least one function (for example, a sound playing function or an image playing function), and the like. In addition, the memory 1009 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another non-volatile solid-state storage device.

The processor 1010 may include one or more processing units. Optionally, an application processor and a modem processor may be integrated into the processor 1010. The application processor mainly processes an operating system, a user interface, an application, an instruction, or the like. The modem processor mainly processes wireless communication, for example, a baseband processor. It may be understood that, alternatively, the modem processor may not be integrated into the processor 1010.

The radio frequency unit 1001 is configured to obtain target information, where the target information is associated with a plurality of candidate resources for physical downlink control channel (PDCCH) repetition transmission; and the processor 1010 is configured to determine a terminal behavior based on the target information.

Further, the target information includes downlink control information (DCI) carrying a minimum scheduling slot offset indicator, and the DCI is transmitted on the plurality of candidate resources; and correspondingly, the processor 1010 is configured to determine a scheduling slot delay value of the terminal based on whether a reference PDCCH candidate resource is within first n orthogonal frequency division multiplexing (OFDM) symbols of a current slot, where n is a positive integer, where the reference PDCCH candidate resource is a latest PDCCH candidate resource among the plurality of candidate resources.

Further, the target information includes DCI carrying a minimum scheduling slot offset indicator, and the DCI is transmitted on the plurality of candidate resources; and correspondingly, the processor 1010 is configured to trigger the terminal to determine a scheduling slot delay value based on whether a reference PDCCH candidate resource is within first n orthogonal frequency division multiplexing (OFDM) symbols of a current slot, where n is a positive integer, where the reference PDCCH candidate resource is a latest PDCCH candidate resource among the plurality of candidate resources.

Further, the latest PDCCH candidate resource is:

a candidate resource at a latest start position among the plurality of candidate resources; or a candidate resource at a latest end position among the plurality of candidate resources.

Further, the scheduling slot delay value of the terminal is a first scheduling slot delay value in a case that the start position or the end position of the reference PDCCH candidate resource is within the first n OFDM symbols of the current slot; and the scheduling slot delay value of the terminal is a second scheduling slot delay value in a case that the start position or the end position of the reference PDCCH candidate resource is outside the first n OFDM symbols of the current slot.

Further, in a case that the terminal is configured with a search space switching function, search spaces corresponding to the plurality of candidate resources respectively have a same search space group index.

Further, the target information includes a first PDCCH and a second PDCCH, where the first PDCCH carries bandwidth part (BWP) switching information, the second PDCCH carries channel state information (CSI) trigger information, and an activated BWP in which the second PDCCH is located and an activated BWP in which the terminal receives a channel state information-reference signal (CSI-RS) with non-zero power triggered by the second PDCCH are different BWPs.

Further, in time, a first PDCCH candidate resource is a latest PDCCH candidate resource among N PDCCH candidate resources configured for and occupied by the first PDCCH, a second PDCCH candidate resource is a latest PDCCH candidate resource among M PDCCH resources configured for and occupied by the second PDCCH, and a third PDCCH candidate resource is an earliest candidate resource among the M PDCCH resources configured for and occupied by the second PDCCH; and an end position of a span occupied by the first PDCCH candidate resource is not later than an end position of a span occupied by the second PDCCH candidate resource; or an end position of a span occupied by the first PDCCH candidate resource is not later than an end position of a span occupied by the third PDCCH candidate resource, where N is greater than or equal to 1, and M is greater than or equal to 1.

Further, the latest PDCCH candidate resource among the N PDCCH candidate resources is:

a candidate resource at a latest start position among the N PDCCH candidate resources; or a candidate resource at a latest end position among the N PDCCH candidate resources; and/or the latest PDCCH candidate resource among the M PDCCH candidate resources is:

a candidate resource at a latest start position among the M PDCCH candidate resources; or a candidate resource at a latest end position among the M PDCCH candidate resources.

Further, the processor 1010 is configured to: when it is determined, based on the target information, that a fourth PDCCH candidate resource among the plurality of candidate resources overlaps, in time, with a radio frequency switching time of the terminal, or with a time of sending a sounding reference signal (SRS) on another carrier frequency, skip monitoring the fourth PDCCH candidate resource, and the terminal determines that a PDCCH configured with detection is repetition transmission.

Further, the processor 1010 is configured to: when it is determined, based on the target information, that a fifth PDCCH candidate resource among the plurality of candidate resources meets a preset condition, skip monitoring the fifth PDCCH candidate resource; and if a time-frequency resource of the fifth PDCCH candidate resource partially overlaps with a time-frequency resource of a PDSCH scheduled in the PDCCH repetition transmission, the terminal demodulates the PDSCH based on at least one of the following:

the terminal considers that an overlapping resource is not used for carrying the PDSCH, and performs rate matching on the overlapping resource;

the terminal considers that an overlapping resource is used for carrying the PDSCH, and does not perform rate matching on the overlapping resource;

if the preset condition is configured through radio resource control (RRC), the terminal considers that an overlapping resource is used for carrying the physical downlink shared channel (PDSCH), and does not perform rate matching on the overlapping resource;

if the preset condition is configured through DCI, the terminal considers that an overlapping resource is not used for carrying the PDSCH, and performs rate matching on the overlapping resource;

base on a configuration or an indication of a network side device, the terminal considers that an overlapping resource is not used for carrying the PDSCH, and performs rate matching on the overlapping resource; and base on the configuration or the indicator of the network side device, the terminal considers that an overlapping resource is used for carrying the PDSCH, and does not perform rate matching on the overlapping resource.

Further, the preset condition includes one of the following:

the time-frequency resource of the fifth PDCCH candidate resource overlaps with a time-domain resource of a synchronization signal block (SSB);

the time-frequency resource of the fifth PDCCH candidate resource overlaps with a time-frequency resource of a target resource configured at a higher layer of the network side device;

the time-frequency resource of the fifth PDCCH candidate resource overlaps with a time-frequency resource of an uplink sending signal; and the time-frequency resource of the fifth PDCCH candidate resource overlaps with a radio frequency adjustment time.

Further, the processor 1010 is configured to determine the terminal behavior when it is determined, based on the target information, that on a monitoring occasion, initial control channel element (CCE) indexes of a PDCCH candidate resource at a first aggregation level and a PDCCH candidate resource at a second aggregation level are the same, a control resource set (CORESET) associated with the PDCCH candidate resource at the first aggregation level and the PDCCH candidate resource at second aggregation level is configured as a non-interleaving function, and the CORESET is configured with m OFDM symbols, where m is a positive integer, and the second aggregation level is higher than the first aggregation level.

Further, the terminal behavior includes at least one of the following:

in a case that a PDCCH at the second aggregation level is configured for repetition transmission, a PDCCH at the first aggregation level is configured for single sending, and initial CCE indexes of a PDCCH candidate resource at the first aggregation level and a PDCCH candidate resource at the second aggregation level are the same on the monitoring occasion, if the terminal performs monitoring successfully based on the first aggregation level, the terminal considers that a successfully monitored PDCCH is the PDCCH at the second aggregation level, and the terminal considers that both the PDCCH candidate resource at the second aggregation level and another PDCCH candidate resource at the second aggregation level in repetition transmission are unable to be used for PDSCH signal transmission on a same monitoring occasion;

in a case that a PDCCH at the first aggregation level is configured for repetition transmission, a PDCCH at the second aggregation level is configured for single sending, and initial CCE indexes of a PDCCH candidate resource at the second aggregation level and a PDCCH candidate resource at the first aggregation level are the same on the monitoring occasion, if the terminal performs monitoring successfully based on the first aggregation level, the terminal considers that a successfully monitored PDCCH is the PDCCH at the first aggregation level, and the terminal considers that only a PDCCH time-frequency resource at the first aggregation level is unable to be used for PDSCH signal transmission on the monitoring occasion, or the terminal considers that a PDCCH time-frequency resource at the second aggregation level is unable to be used for PDSCH signal transmission on the monitoring occasion;

in a case that a PDCCH at the first aggregation level is configured for repetition transmission, a PDCCH at the second aggregation level is configured for repetition transmission, and an initial CCE index of one PDCCH candidate resource at the first aggregation level is the same as an initial CCE index of one PDCCH candidate resource at the second aggregation level on at least one monitoring occasion, if the terminal performs monitoring successfully based on the first aggregation level, the terminal considers that a successfully monitored PDCCH is the PDCCH at the second aggregation level, and the terminal considers that both the PDCCH candidate resource at the second aggregation level and another PDCCH candidate resource at the second aggregation level in repetition transmission are unable to be used for PDSCH signal transmission on a same monitoring occasion;

in a case that a PDCCH at the second aggregation level is configured for repetition transmission, a PDCCH at the first aggregation level is configured for single sending, and initial CCE indexes of a PDCCH candidate resource at the first aggregation level and a PDCCH candidate resource at the second aggregation level are the same on the monitoring occasion, the terminal performs monitoring based on only the first aggregation level or the second aggregation level, or the terminal selects a PDCCH at an aggregation level configured for repetition transmission to monitor;

in a case that a PDCCH at the first aggregation level is configured for repetition transmission, a PDCCH at the second aggregation level is configured for single sending, and initial CCE indexes of a PDCCH candidate resource at the second aggregation level and a PDCCH candidate resource at the first aggregation level are the same on the monitoring occasion, the terminal performs monitoring based on only the first aggregation level or the second aggregation level, or the terminal selects a PDCCH at an aggregation level configured for repetition transmission to monitor; and in a case that a PDCCH at the first aggregation level is configured for repetition transmission, a PDCCH at the second aggregation level is configured for repetition transmission, and an initial CCE index of one PDCCH candidate resource at the first aggregation level is the same as an initial CCE index of one PDCCH candidate resource at the second aggregation level on at least one monitoring occasion, the terminal performs monitoring based on only the first aggregation level or the second aggregation level.

Further, in a case that the terminal does not support a capability of independently monitoring a PDCCH candidate resource, a PDCCH for non-repetition transmission is sent on a sixth PDCCH candidate resource, and the sixth PDCCH candidate resource comes from a search space with a minimum identifier (ID) among at least two associated search spaces for PDCCH repetition transmission.

Further, L1 candidate resources among the plurality of candidate resources have time overlap, the L1 candidate resources are associated with K CORESETs, and the K CORESETs are associated with different pieces of quasi co-location (QCL)-typeD information; and if the terminal receives a PDCCH on a current symbol and receives a CSI-RS resource on the current symbol, and a CSI-RS set associated with the CSI-RS resource is configured to enable and close a repetition sending parameter, then the QCL-typeD information of the CSI-RS is the same as QCL-typeD information of a target reference CORESET in the K CORESETs, where the current symbol is a symbol in the time overlap, and the L1 candidate resources include at least two candidate resources carrying the same DCI, or the L1 candidate resources include at least two candidate resources carrying different pieces of DCI; and L1 is an integer greater than 1, K is an integer greater than 1, and L1 is greater than or equal to K.

Further, a target PDCCH resource has time overlap with L2 candidate resources among the plurality of candidate resources, the target PDCCH resource and the L2 candidate resources are associated with K CORESETs, and the K CORESETs are associated with different pieces of QCL-typeD information; and if the terminal receives a PDCCH on a current symbol and receives a CSI-RS resource on the current symbol, and a CSI-RS set associated with the CSI-RS resource is configured to enable and close a repetition sending parameter, then the QCL-typeD information of the CSI-RS is the same as QCL-typeD information of a target reference CORESET in the K CORESETs, where the target PDCCH resource is a candidate resource that is not used for PDCCH repetition transmission, the current symbol is a symbol in the time overlap, and at least one candidate resource of the target PDCCH resource and the L2 candidate resources carries same DCI, or at least one candidate resource of the target PDCCH resource and the L2 candidate resources carries different pieces of DCI; and L2 is a positive integer, and K is an integer greater than 1.

Further, in a case that the current symbol is within a preset default receiving beam time threshold, the QCL-typeD information of the PDSCH received by the terminal on the current symbol is the same as the QCL-typeD information of the target reference CORESET among K CORESETs.

Further, the target reference CORESET is a CORESET with a minimum identifier among the K CORESETs.

The terminal 1000 provided in the foregoing embodiment can implement processes implemented in the method embodiment of FIG. 2, and a same technical effect is achieved. To avoid repetition, details are not described herein again.

An embodiment of this application further provides a readable storage medium. A program or an instruction is stored in the readable storage medium. When the program or the instruction is executed by a processor, the processes of the method embodiment in FIG. 2 are implemented, and a same technical effect can be achieved. To avoid repetition, details are not described herein again.

The processor is a processor in the terminal or the network side device in the foregoing embodiment. The readable storage medium includes a computer-readable storage medium, such as a computer read-only memory (ROM), a random access memory (RAM), a magnetic disk, or an optical disc.

An embodiment of this application further provides a computer program product. The computer program product is stored in a non-transient storage medium. The computer program product is executed by at least one processor to implement processes of the method embodiment in FIG. 2, and a same technical effect can be achieved. To avoid repetition, details are not described herein again.

An embodiment of this application further provides a chip. The chip includes a processor and a communications interface. The communications interface is coupled to the processor, and when the processor is configured to run a program or instructions of a network side device, the processes of the method embodiment in FIG. 2 are implemented, and a same technical effect can be achieved. To avoid repetition, details are not described herein again.

It should be understood that the chip mentioned in this embodiment of this application may also be referred to as a system-level chip, a system chip, a chip system, or a system on chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the implementations of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network, or the like) to perform the method described in the embodiments of this application.

The embodiments of this application are described above with reference to the accompanying drawings, but this application is not limited to the foregoing specific implementations, and the foregoing specific implementations are only illustrative and not restrictive. Under the enlightenment of this application, a person of ordinary skill in the art can make many forms without departing from the purpose of this application and the protection scope of the claims, all of which fall within the protection of this application.

The invention claimed is:

1. A behavior determining method, comprising:

obtaining, by a terminal, target information, wherein the target information comprises downlink control information (DCI) carrying a minimum scheduling slot offset indicator, and the DCI is transmitted on a plurality of candidate resources for physical downlink control channel (PDCCH) repetition transmission; and determining, by the terminal, a scheduling slot delay value based on whether a reference PDCCH candidate resource is within first n orthogonal frequency division multiplexing (OFDM) symbols of a current slot, wherein n is a positive integer, wherein the reference PDCCH candidate resource is a latest PDCCH candidate resource among the plurality of candidate resources.

2. The method according to claim 1, further comprising: triggering, by the terminal based on the target information, the terminal to determine the scheduling slot delay value.

3. The method according to claim 1, wherein the latest PDCCH candidate resource is: a candidate resource at a latest start position among the plurality of candidate resources; or a candidate resource at a latest end position among the plurality of candidate resources.

4. The method according to claim 1, wherein the determining, by the terminal, a scheduling slot delay value of the terminal based on whether a reference PDCCH candidate resource is within first n OFDM symbols of a current slot comprises: determining the scheduling slot delay value of the terminal as a first scheduling slot delay value in a case that the start position or the end position of the reference PDCCH candidate resource is within the first n OFDM symbols of the current slot; and determining the scheduling slot delay value of the terminal as a second scheduling slot delay value in a case that the start position or the end position of the reference PDCCH candidate resource is outside the first n OFDM symbols of the current slot.

5. The method according to claim 1, wherein in a case that the terminal is configured with a search space switching function, search spaces corresponding to the plurality of candidate resources respectively have a same search space group index.

6. The method according to claim 1, wherein the target information comprises a first PDCCH and a second PDCCH, wherein the first PDCCH carries bandwidth part (BWP) switching information, the second PDCCH carries channel state information (CSI) trigger information, and an activated BWP in which the second PDCCH is located and an activated BWP in which the terminal receives a channel state information-reference signal (CSI-RS) with non-zero power triggered by the second PDCCH are different BWPs.

7. The method according to claim 6, wherein a first PDCCH candidate resource is a latest PDCCH candidate resource among N PDCCH candidate resources configured for and occupied by the first PDCCH, a second PDCCH candidate resource is a latest PDCCH candidate resource among M PDCCH resources configured for and occupied by the second PDCCH, and a third PDCCH candidate resource is an earliest candidate resource among the M PDCCH resources configured for and occupied by the second PDCCH; and an end position of a span occupied by the first PDCCH candidate resource is not later than an end position of a span occupied by the second PDCCH candidate resource; or an end position of a span occupied by the first PDCCH candidate resource is not later than an end position of a span occupied by the third PDCCH candidate resource, wherein N is greater than or equal to 1, and M is greater than or equal to 1.

8. The method according to claim 7, wherein the latest PDCCH candidate resource among the N PDCCH candidate resources is:

a candidate resource at a latest start position among the N PDCCH candidate resources, or a candidate resource at a latest end position among the N PDCCH candidate resources; and/or the latest PDCCH candidate resource among the M PDCCH candidate resources is:

a candidate resource at a latest start position among the M PDCCH candidate resources, or a candidate resource at a latest end position among the M PDCCH candidate resources.

9. The method according to claim 1, further comprising:

upon determination, based on the target information, that a fourth PDCCH candidate resource among the plurality of candidate resources overlaps, in time, with a radio frequency switching time of the terminal, or with a time of sending a sounding reference signal (SRS) on another carrier frequency, skipping monitoring, by the terminal, the fourth PDCCH candidate resource, and determining, by the terminal, that a PDCCH configured with detection is repetition transmission.

10. The method according to claim 1, further comprising:

upon determination, based on the target information, that a fifth PDCCH candidate resource among the plurality of candidate resources meets a preset condition, skipping monitoring, by the terminal, the fifth PDCCH candidate resource; and when a time-frequency resource of the fifth PDCCH candidate resource partially overlaps with a time-frequency resource of a PDSCH scheduled in the PDCCH repetition transmission, the terminal demodulates the PDSCH based on at least one of the following:

the terminal considers that an overlapping resource is not used for carrying the PDSCH, and performs rate matching on the overlapping resource;

the terminal considers that an overlapping resource is used for carrying the PDSCH, and does not perform rate matching on the overlapping resource;

when the preset condition is configured through radio resource control (RRC), the terminal considers that an overlapping resource is used for carrying the physical downlink shared channel (PDSCH), and does not perform rate matching on the overlapping resource;

when the preset condition is configured through DCI, the terminal considers that an overlapping resource is not used for carrying the PDSCH, and performs rate matching on the overlapping resource;

base on a configuration or an indication of a network side device, the terminal considers that an overlapping resource is not used for carrying the PDSCH, and performs rate matching on the overlapping resource; or base on the configuration or the indicator of the network side device, the terminal considers that an overlapping resource is used for carrying the PDSCH, and does not perform rate matching on the overlapping resource.

11. The method according to claim 10, wherein the preset condition comprises one of the following:

the time-frequency resource of the fifth PDCCH candidate resource overlaps with a time-domain resource of a synchronization signal block (SSB);

the time-frequency resource of the fifth PDCCH candidate resource overlaps with a time-frequency resource of a target resource configured at a higher layer of the network side device;

the time-frequency resource of the fifth PDCCH candidate resource overlaps with a time-frequency resource of an uplink sending signal; and the time-frequency resource of the fifth PDCCH candidate resource overlaps with a radio frequency adjustment time.

12. The method according to claim 1, further comprising: determining a terminal behavior upon determination, based on the target information, that on a monitoring occasion, initial control channel element (CCE) indexes of a PDCCH candidate resource at a first aggregation level and a PDCCH candidate resource at a second aggregation level are the same, a control resource set (CORESET) associated with the PDCCH candidate resource at the first aggregation level and the PDCCH candidate resource at second aggregation level is configured as a non-interleaving function, and the CORESET is configured with m OFDM symbols, wherein m is a positive integer, and the second aggregation level is higher than the first aggregation level.

13. The method according to claim 12, wherein the terminal behavior comprises at least one of the following:

in a case that a PDCCH at the second aggregation level is configured for repetition transmission, a PDCCH at the first aggregation level is configured for single sending, and initial CCE indexes of a PDCCH candidate resource at the first aggregation level and a PDCCH candidate resource at the second aggregation level are the same on the monitoring occasion, when the terminal performs monitoring successfully based on the first aggregation level, the terminal considers that a successfully monitored PDCCH is the PDCCH at the second aggregation level, and the terminal considers that both the PDCCH candidate resource at the second aggregation level and another PDCCH candidate resource at the second aggregation level in repetition transmission are unable to be used for PDSCH signal transmission on a same monitoring occasion;

in a case that a PDCCH at the first aggregation level is configured for repetition transmission, a PDCCH at the second aggregation level is configured for single sending, and initial CCE indexes of a PDCCH candidate resource at the second aggregation level and a PDCCH candidate resource at the first aggregation level are the same on the monitoring occasion, when the terminal performs monitoring successfully based on the first aggregation level, the terminal considers that a successfully monitored PDCCH is the PDCCH at the first aggregation level, and the terminal considers that only a PDCCH time-frequency resource at the first aggregation level is unable to be used for PDSCH signal transmission on the monitoring occasion, or the terminal considers that a PDCCH time-frequency resource at the second aggregation level is unable to be used for PDSCH signal transmission on the monitoring occasion;

in a case that a PDCCH at the first aggregation level is configured for repetition transmission, a PDCCH at the second aggregation level is configured for repetition transmission, and an initial CCE index of one PDCCH candidate resource at the first aggregation level is the same as an initial CCE index of one PDCCH candidate resource at the second aggregation level on at least one monitoring occasion, when the terminal performs monitoring successfully based on the first aggregation level, the terminal considers that a successfully monitored PDCCH is the PDCCH at the second aggregation level, and the terminal considers that both the PDCCH candidate resource at the second aggregation level and another PDCCH candidate resource at the second aggregation level in repetition transmission are unable to be used for PDSCH signal transmission on a same monitoring occasion;

in a case that a PDCCH at the second aggregation level is configured for repetition transmission, a PDCCH at the first aggregation level is configured for single sending, and initial CCE indexes of a PDCCH candidate resource at the first aggregation level and a PDCCH candidate resource at the second aggregation level are the same on the monitoring occasion, the terminal performs monitoring based on only the first aggregation level or the second aggregation level, or the terminal selects a PDCCH at an aggregation level configured for repetition transmission to monitor;

in a case that a PDCCH at the first aggregation level is configured for repetition transmission, a PDCCH at the second aggregation level is configured for single sending, and initial CCE indexes of a PDCCH candidate resource at the second aggregation level and a PDCCH candidate resource at the first aggregation level are the same on the monitoring occasion, the terminal performs monitoring based on only the first aggregation level or the second aggregation level, or the terminal selects a PDCCH at an aggregation level configured for repetition transmission to monitor; or in a case that a PDCCH at the first aggregation level is configured for repetition transmission, a PDCCH at the second aggregation level is configured for repetition transmission, and an initial CCE index of one PDCCH candidate resource at the first aggregation level is the same as an initial CCE index of one PDCCH candidate resource at the second aggregation level on at least one monitoring occasion, the terminal performs monitoring based on only the first aggregation level or the second aggregation level.

14. The method according to claim 1, wherein in a case that the terminal does not support a capability of independently monitoring a PDCCH candidate resource, a PDCCH for non-repetition transmission is sent on a sixth PDCCH candidate resource, and the sixth PDCCH candidate resource comes from a search space with a minimum identifier (ID) among at least two associated search spaces for PDCCH repetition transmission.

15. The method according to claim 1, wherein L1 candidate resources among the plurality of candidate resources have time overlap, the L1 candidate resources are associated with K CORESETs, and the K CORESETs are associated with different pieces of quasi co-location (QCL)-typeD information; and when the terminal receives a PDCCH on a current symbol and receives a CSI-RS resource on the current symbol, and a CSI-RS set associated with the CSI-RS resource is configured to enable and close a repetition sending parameter, then the QCL-typeD information of the CSI-RS is the same as QCL-typeD information of a target reference CORESET in the K CORESETs, wherein the current symbol is a symbol in the time overlap, and the L1 candidate resources comprise at least two candidate resources carrying the same DCI, or the L1 candidate resources comprise at least two candidate resources carrying different pieces of DCI; and L1 is an integer greater than 1, K is an integer greater than 1, and L1 is greater than or equal to K.

16. The method according to claim 1, wherein a target PDCCH resource has time overlap with L2 candidate resources among the plurality of candidate resources, the target PDCCH resource and the L2 candidate resources are associated with K CORESETs, and the K CORESETs are associated with different pieces of QCL-typeD information; and when the terminal receives a PDCCH on a current symbol and receives a CSI-RS resource on the current symbol, and a CSI-RS set associated with the CSI-RS resource is configured to enable and close a repetition sending parameter, then the QCL-typeD information of the CSI-RS is the same as QCL-typeD information of a target reference CORESET in the K CORESETs, wherein the target PDCCH resource is a candidate resource that is not used for PDCCH repetition transmission, the current symbol is a symbol in the time overlap, and at least one candidate resource of the target PDCCH resource or the L2 candidate resources carries same DCI, or at least one candidate resource of the target PDCCH resource or the L2 candidate resources carries different pieces of DCI; and L2 is a positive integer, and K is an integer greater than 1.

17. The method according to claim 16, wherein the target reference CORESET is a CORESET with a minimum identifier among the K CORESETs.

18. A terminal, comprising a processor implemented in hardware, a memory, and a program or an instruction stored in the memory and executable on the processor, wherein the program or the instruction, when executed by the processor, causes the terminal to perform:

obtaining target information, wherein the target information comprises downlink control information (DCI) carrying a minimum scheduling slot offset indicator, and the DCI is transmitted on a plurality of candidate resources for physical downlink control channel (PDCCH) repetition transmission; and determining a scheduling slot delay value based on whether a reference PDCCH candidate resource is within first n orthogonal frequency division multiplexing (OFDM) symbols of a current slot, wherein n is a positive integer, wherein the reference PDCCH candidate resource is a latest PDCCH candidate resource among the plurality of candidate resources.

19. A non-transitory readable storage medium having a program or an instruction stored thereon that, when the program or the instruction is executed by a hardware processor of a terminal, causes the hardware processor of the terminal to perform:

obtaining target information, wherein the target information comprises downlink control information (DCI) carrying a minimum scheduling slot offset indicator, and the DCI is transmitted on a plurality of candidate resources for physical downlink control channel (PDCCH) repetition transmission; and determining a scheduling slot delay value based on whether a reference PDCCH candidate resource is within first n orthogonal frequency division multiplexing (OFDM) symbols of a current slot, wherein n is a positive integer, wherein the reference PDCCH candidate resource is a latest PDCCH candidate resource among the plurality of candidate resources.

* * * * *